United States Patent [19]
Otsuka et al.

[11] Patent Number: 6,010,146
[45] Date of Patent: Jan. 4, 2000

[54] AIR BAG DEVICE FOR VEHICLE

[75] Inventors: Masakatsu Otsuka; Takayuki Kato; Yoshinori Mihara; Toru Ozaki, all of Osaka, Japan

[73] Assignee: Toyo Tire & Rubber Co., Ltd., Osaka, Japan

[21] Appl. No.: 09/123,268

[22] Filed: Jul. 28, 1998

[30] Foreign Application Priority Data

Aug. 6, 1997 [JP] Japan ..................................... 9-225666

[51] Int. Cl.[7] .................................................. B60R 21/16
[52] U.S. Cl. ..................................... 280/728.2; 280/728.3; 280/732
[58] Field of Search ............................. 280/728.2, 728.3, 280/732, 731, 728.1

[56] References Cited

U.S. PATENT DOCUMENTS

| | | |
|---|---|---|
| 3,708,179 | 1/1973 | Hulten . |
| 3,817,552 | 6/1974 | Knight, IV et al. . |
| 3,904,222 | 9/1975 | Bursott et al. . |
| 3,944,250 | 3/1976 | Wulf et al. . |
| 3,966,227 | 6/1976 | Cameron . |
| 4,325,568 | 4/1982 | Clark et al. . |
| 4,770,439 | 9/1988 | Maier et al. . |
| 5,060,972 | 10/1991 | Satoh et al. . |
| 5,435,593 | 7/1995 | Hiramitsu et al. ............... 280/728.2 |
| 5,658,008 | 8/1997 | Herrmann et al. ............... 280/728.2 |
| 5,692,772 | 12/1997 | Boxey et al. ..................... 280/728.2 |
| 5,697,636 | 12/1997 | Onme et al. ..................... 280/728.2 |
| 5,735,542 | 4/1998 | Bohn . |
| 5,779,261 | 7/1998 | Honda ............................. 280/728.2 |
| 5,791,682 | 8/1998 | Hiramitsu et al. ............... 280/728.2 |

FOREIGN PATENT DOCUMENTS

| | | | |
|---|---|---|---|
| 447030 | 9/1991 | European Pat. Off. ............ 280/728.2 |

*Primary Examiner*—Christopher P. Ellis
*Attorney, Agent, or Firm*—Jordan and Hamburg LLP

[57] ABSTRACT

The present invention relates to an air bag device for a vehicle comprising an inflator, an air bag, an air bag case for storing these and an air bag door, in which the air bag and the air bag door are attached to the air bag case by inserting a retainer bar in a shape of a locking bar from a retainer addingly brought into contact with the inner side of a side wall of the air bag case through engaging loop portions penetrating the side wall of the air bag case, the air bag door and the air bag, and in which the air bag and the air bag door are attached to the air bag case. In the above air bag device, by improving a structure of a support portion for supporting the retainer bar inserted through the loop portions, projections of the air bag case are reduced, compact formation and light weight formation of a module is achieved and mountability, strength and economic performance are promoted. As means therefor, the retainer is installed with support pieces for the retainer bar projected from base portions of the loop portions, elastically pressing the retainer bar to tip portions of the loop portions and pinching and supporting the retainer bar between the support pieces and the front end portions of the loop portions in the loop portions.

4 Claims, 7 Drawing Sheets

AIR BAG DEVICE FOR VEHICLE

FIELD OF THE INVENTION

The present invention relates to an air bag device for a vehicle, in details, to an improvement in a retainer for attaching an air bag and an air bag door to an air bag case.

1. Background of the invention
2. Description of Related Art

An air bag device is a device for restraining a passenger by expanding an air bag by gas pressure in collision of a vehicle. For example, an air bag device for a passenger's seat (a seat for a person next to driver) is generally provided with an inflator which is a gas generator, an air bag to be expanded by gas of the inflator, an air bag case for storing the inflator and the air bag and an air bag door for closing an opening portion of the air bag case. The air bag device is normally installed at an inner space of an instrument panel and is constituted such that the air bag is expanded out into a vehicle compartment by breaking the air bag door.

With regard to an air bag device mentioned above, there have been various structures for methods of attaching the air bag and the air bag door to the air bag case and the applicant has proposed the following attaching structure in Japanese Patent Application No. 8-176125 or the like.

According to the proposed air bag device, an attachment base of a lip portion of an air bag and a door-attaching flange which is extended from an air bag door along a side wall of an air bag case, are overlapped to the side wall at a vicinity of an opening portion of the air bag case, a retainer in a plate or rod-like shape is addingly installed at an inner side of the side wall of the case, pluralities of through holes coinciding with each other are respectively formed at the side wall of the case, the attachment base of the air bag and the door-attaching flange and in the meantime, a plurality of engaging loop portions penetrating the respective through holes are projected at the retainer and a retainer bar is inserted through the loop portions in a shape of a locking bar by which the attachment base of the air bag and the door-attaching flange are attached to the side wall of the air bag case.

Meanwhile, according to the proposed structure for attaching an air bag or the like, in order to fix the retainer bar which is inserted into the loop portions of the retainer, support portions which are brought into elastic contact with the retainer bar are installed to the air bag case in a projected shape.

In the case of the proposed device, the support portion is constituted by a piece which is cut to rise from the side wall of the air bag case at a position remote from the loop portions or by addingly installing a separate part of a spring leaf or the like which is separately formed to the air bag case by welding means.

However, the support portion comprising the piece which is cut to rise from the air bag case, poses a problem where gas leakage from the cut-to-rise portion or lowering in strength of the case per se or the like is caused. Further, according to the support portion in the latter case comprising a separate part of a spring leaf or the like, there poses a problem where an increase in the cost owing to an increase in a number of parts and a welding step, a height difference of the support portion owing to a dispersion in accuracy of welding or the like is caused. Further, as a drawback common to both, the support portion may be deformed by handling thereof in integrating a module by which mountability thereof to an instrument panel may be deteriorated.

SUMMARY OF THE INVENTION

In view of the actual situation mentioned above, the present invention resolves the above-described problem and achieves promotion of mountability to an instrument panel, strength and economic performance by adopting a novel constitution for a support portion for supporting a retainer bar mentioned above.

According to an aspect of the present invention, there is provided an air bag device for a vehicle comprising an inflator which is a gas generator, an air bag expanded by gas from the inflator, an air bag case for storing the inflator and the air bag and an air bag door for closing an opening portion of the air bag case, wherein an attachment base portion at a lip portion of the air bag and a door attaching flange extended from the air bag door along a side wall of the air bag case are overlapped at the side wall of the air bag case at a vicinity of the opening portion, pluralities of through holes coinciding with each other are formed respectively at the side wall of the air bag case, the attachment base portion of the air bag and the door attaching flange, a retainer addingly brought into contact with an inner side of the side wall of the air bag case is provided, a plurality of engaging loop portions penetrating the through holes are projected from the retainer and in the penetrated state, a retainer bar in a shape of a locking bar is inserted through the loop portions by which the attachment base portion of the air bag and the flange for attaching the air bag door are attached to the side wall of the air bag case, and wherein the retainer is installed with support pieces for the retainer bar projected from base portions of the loop portions into the loop portions, elastically pressing the retainer bar to front end sides of the loop portions and pinching and supporting the retainer bar between the support pieces and the front end portions of the loop portions.

According to the air bag device, the support pieces for the retainer bar are installed in the retainer and accordingly, it is not necessary to cut to rise portions of the air bag case or to weld separate parts as in the conventional device. Therefore, gas leakage or lowering of strength of the case per se caused by cutting to rise portions of the air bag case, can be prevented and an increase in the cost owing to spot welding can be restrained.

Particularly, the support pieces are installed to project into the loop portions of the retainer and accordingly, deformation of the support pieces in handling can be prevented by being guarded by the loop portions, projections from the air bag case can be made fewer than the conventional device and the mountability to an instrument panel can be promoted.

Further, the insertion strength of the retainer bar can easily be adjusted by a relationship between a plate thickness of the retainer bar and a clearance between the loop portion and the support piece and further, by a number of the support pieces and accordingly, in addition to an effect owing to the presence of the support piece in the loop portion, the operation of inserting the retainer bar can be facilitated and the assembling performance of the air bag device can significantly be promoted.

Further, although in expanding the air bag, stress is concentrated at the loop portion of the retainer since the door is pulled in a direction of expanding the air bag, the support piece is present at inside of the loop portion and therefore, the strength is promoted by which light weight formation of the module can be achieved by thinning the plate thickness of the loop portion or the retainer bar.

According to the air bag device, the support piece can be formed by a tongue-like piece having a tangible width in a direction substantially orthogonal to the opening face of the air bag case. Thereby, the reinforcement effect of the loop portion can further be promoted.

Further, according to the air bag device, an engaging spring piece capable of passing through the loop portion by being elastically deformed and constituting a come-off preventing piece by being engaged to a front end side of insertion of the loop portion, is provided at a rear-at-insertion end portion of the retainer bar. Thereby, the retainer bar inserted into the loop portion can be stably maintained in a predetermined inserted state.

Further, a recess portion or a projection portion can be formed at a portion of at least one of an inner side of a tip portion of the loop portion and the support piece which is brought into contact with the retainer bar and a projection portion or a recess portion which is fitted to the recess portion or the projection portion, can be formed in the retainer bar. Thereby, the retainer bar can be prevented from coming off further simply and conveniently.

DETAILED DESCRIPTION OF PREFERRED EMBODIMENTS

An explanation will be given of embodiments according to the present invention in reference to the drawings as follows.

Figure 1:
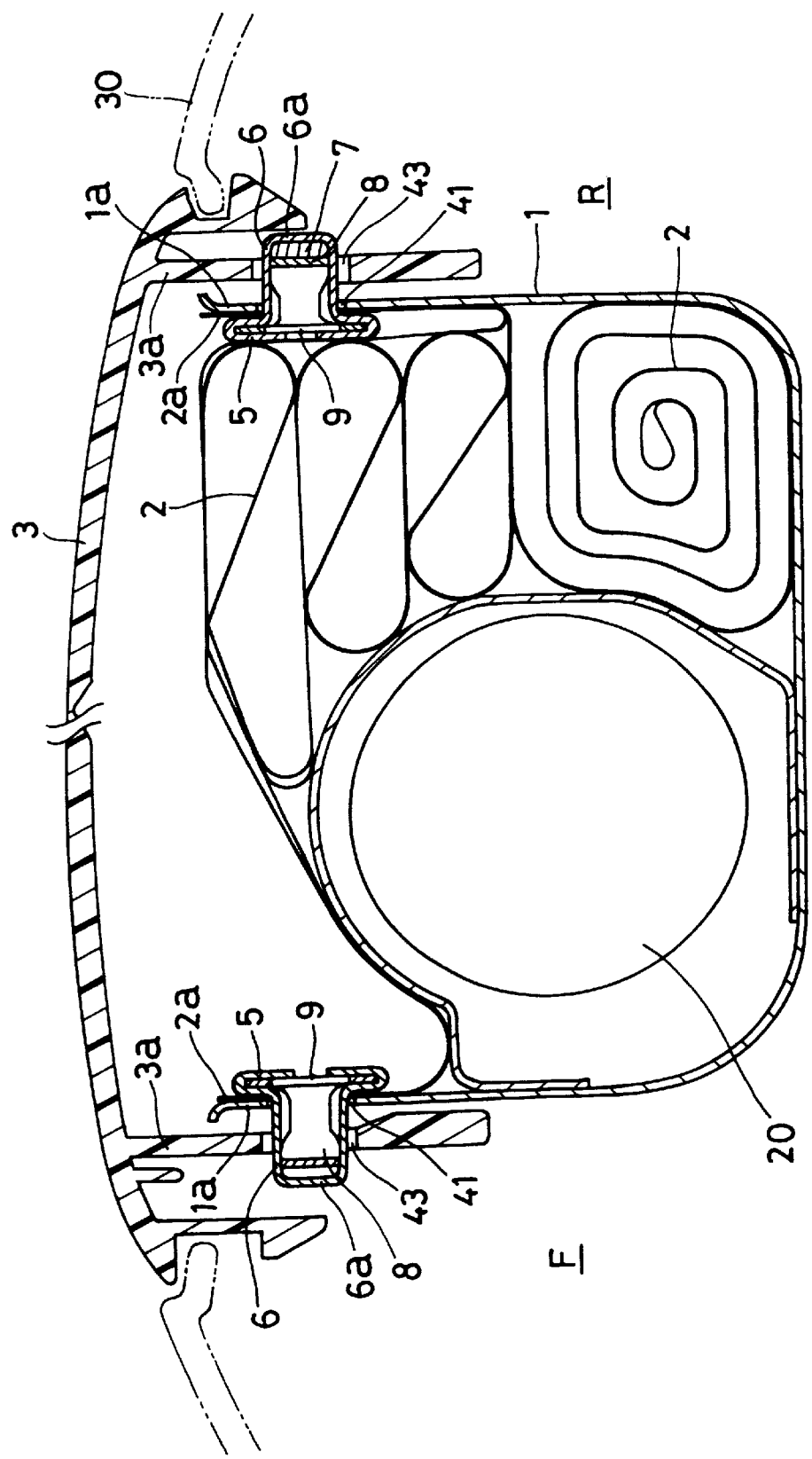
FIG. 1 is a sectional view showing an air bag device for a passenger's seat according to an embodiment of the present invention.

FIG. 1 is a sectional view showing an air bag device for a passenger's seat (a seat for a person next to driver) according to an embodiment of the present invention and in the drawing, notation F designates the front side of a vehicle and notation R designates the rear side of the vehicle, respectively.

As shown by FIG. 1, the air bag device comprises as its basic constitution, an inflator 20 which is a gas generator, an air bag 2 of a bag made of fiber or the like to be expanded by gas of the inflator 20, an air bag case 1 for storing the inflator 20 and the air bag 2, and an air bag door 3 for closing an opening portion of the air bag case 1. Further, the air bag device is installed, for example, at an inner space of an instrument panel 30 and is constituted such that the air bag 2 is expanded out from the opening portion of the air bag case 1 into a vehicle compartment by breaking the air bag door 3.

According to the air bag device, an attachment base 2a at a lip portion of the air bag 2 stored in the case 1 and a door attaching flange 3a extended from the air bag door 3 along a case side wall 1a, are respectively overlapped at the side wall 1a in a vicinity of the opening portion of the air bag case 1, respectively, as illustrated. Pluralities of through holes 41, 42 and 43 coinciding with each other are respectively formed in the case side wall 1a, the attachment base portion 2a for attaching the air bag 2 and the door attaching flange 3a in a direction orthogonal to paper face of FIG. 1, that is, in the peripheral direction of the opening portion of the case at required intervals.

Further, a retainer 5 comprising a metal plate in a flat-rod-like shape is addingly installed at the inner side of the side wall 1a of the case 1. The retainer 5 is projected with a plurality of engaging loop portions 6 penetrating the through holes 41, 42 and 43 at positions corresponding with the respective through holes 41, 42 and 43. The loop portion 6 comprises a projection projected in a ringed shape which is opened in the peripheral direction of the case and as shown by FIG. 2, in a penetrated state mentioned above, by inserting a retainer bar 7 in a shape of a locking bar through the loop portion 6 at outside of the door attaching flange 3a and the like, the attachment base portion 2a of the air bag and the door attaching flange 3a are attached to the side wall 1a of the air bag case.

The fixing structure by using the retainer 5 including the air bag door 3 is implemented at two faces of front and rear portions of the air bag case 1. Further, the attachment base portions 2a of the air bag are fixed to the side wall 1a of the air bag case at four front, rear, left and right faces.

Figure 2:
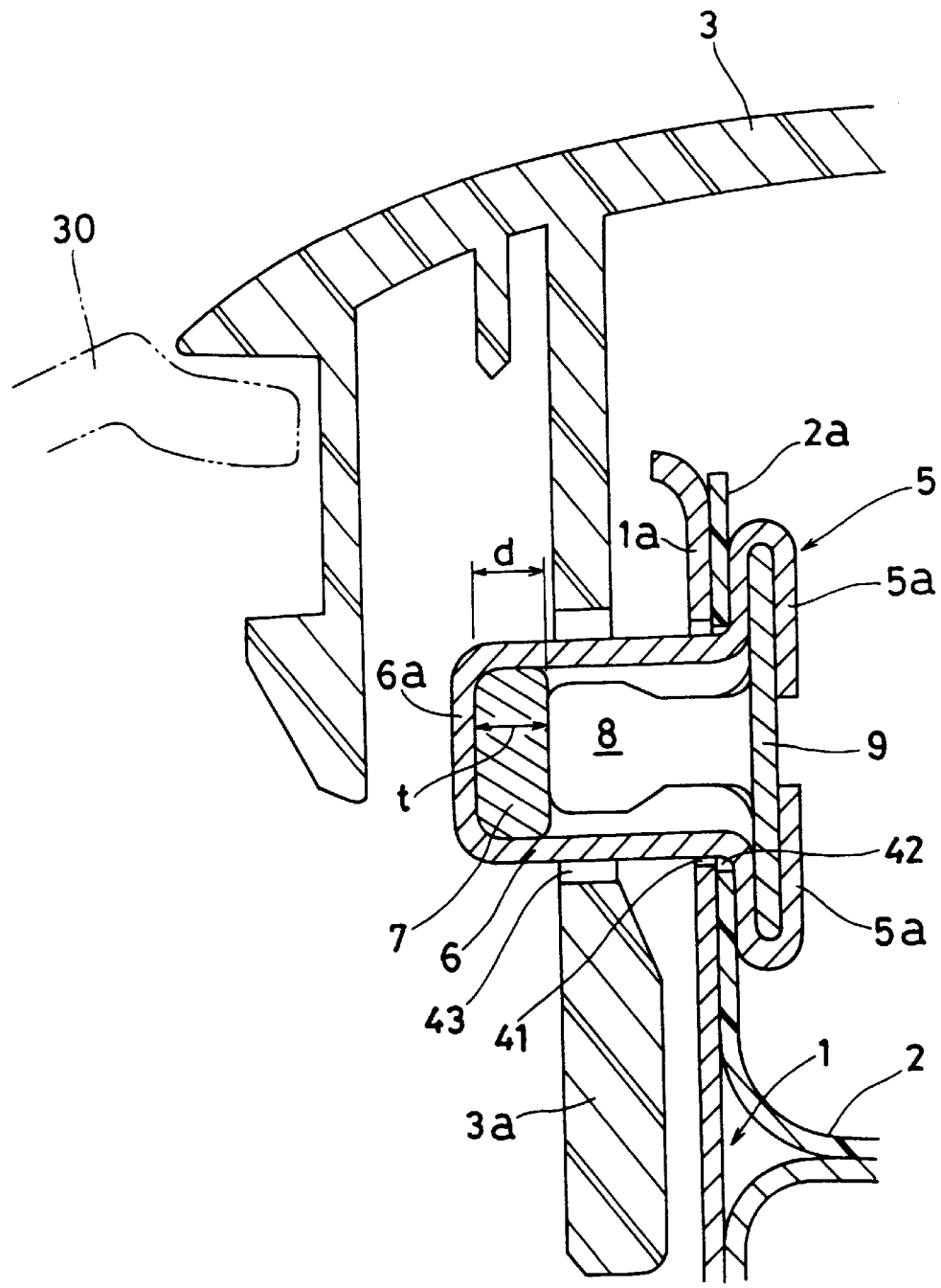
FIG. 2 is a sectional view enlarging essential portions of the air bag device.

Further, as shown by FIG. 1 and FIG. 2, the flange 3a for attaching the air bag door 3 is mounted to the side wall 1a of the air bag case 1 with allowance in the left and right direction as illustrated, the through hole 43 of the attaching flange 3a is also provided with a little gap in upper, lower, left and right directions in respect of the loop portion 6 of the retainer 5 by which displacement of the air bag door 3 in up and down direction, left and right direction and forward and rearward direction is permitted and positioning of the air bag door 3 in respect of the instrument panel 30 is facilitated.

Figure 3:
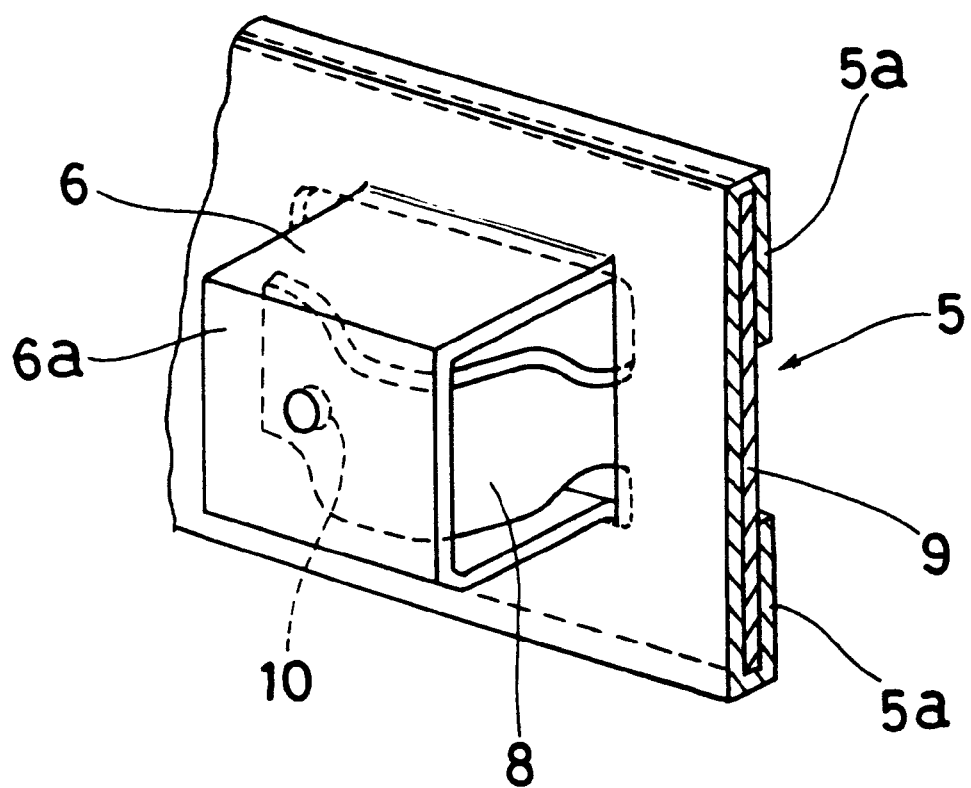
FIG. 3 is an enlarged perspective view showing a retainer and a support piece for a retainer bar.

According to the present invention, in the air bag device having such a constitution, also as shown by FIG. 2 and FIG. 3, the retainer 5 is installed with a plurality of support pieces 8 for retainer bar each of which is projected from a base portion of the loop portion 6 toward outer side of the case at inside of the loop portion 6, which elastically presses the retainer bar 7 to a tip portion of the loop portion 6 and which elastically pinches and supports the retainer bar 7 between the tip portion of the loop portion 6 and the support piece 8.

Figure 4:
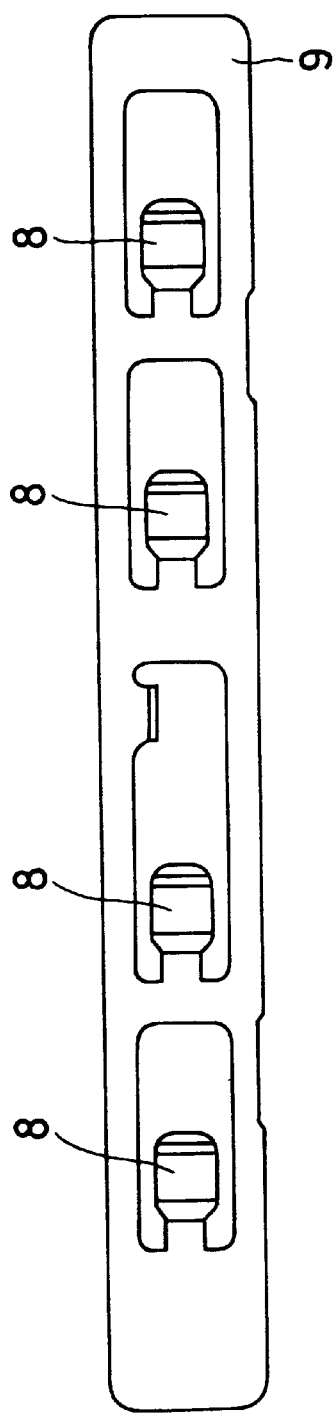
FIG. 4 is a plan view showing the support piece for a retainer bar.
Figure 5:
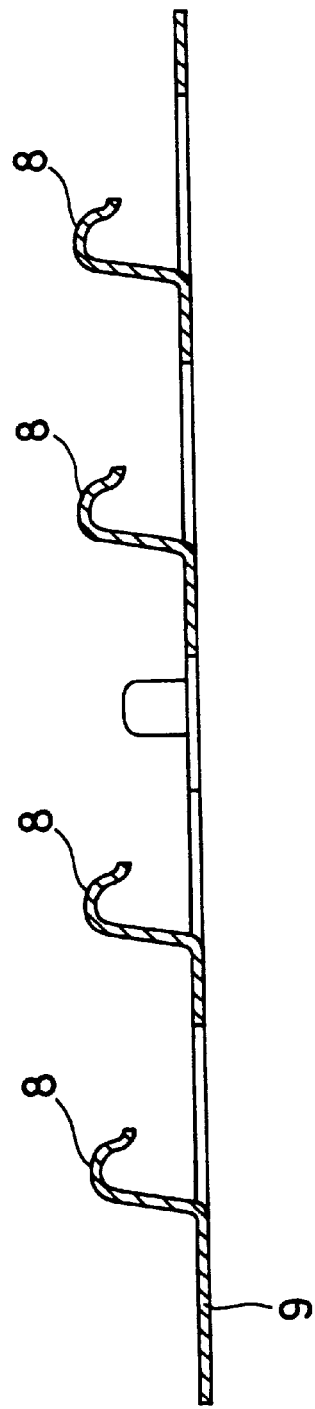
FIG. 5 is a sectional view showing the support piece for a retainer bar.

Also as shown by FIG. 4 and FIG. 5, the support piece 8 for retainer bar comprises a tongue-like piece having pertinent elastic force which is cut to rise from a plate 9 made of a metal and as shown by FIG. 2 and FIG. 3, the tongue-like piece which is cut to rise with a tangible width in a direction substantially orthogonal to the opening face of the air bag case 1, is curved to constitute substantially a J-like shape in view from above in a direction of arranging the loop portions 6 (peripheral direction of opening portion of case) and is respectively arranged in the loop portion 6 of the retainer 5. Therefore, it is not necessary to cut to rise portions of the air bag case or to weld a separate part.

Figure 6:
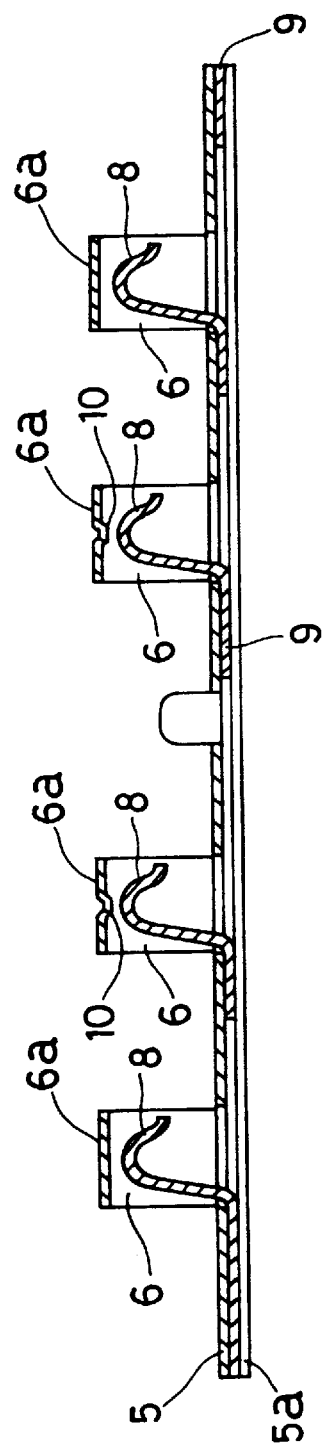
FIG. 6 is a sectional view showing the retainer and the support piece for a retainer bar.

As shown by FIG. 2 and FIG. 6, the support pieces 8 for retainer bar are integrally fixed to the retainer 5 in a state where they are arranged in series in the loop portions 6 as shown by FIG. 6 by seaming and calking side edge portions 5a (extending longitudinally) of a metal plate constituting the retainer 5.

The strength of the retainer 5 including the support pieces 8 for retainer bar and the plate 9, is increased since plate-like portions are triply overlapped at calked portions of the side edge portions 5a. The strength is also promoted since in the loop portions 6, the support pieces 8 in longitudinal direction of the retainer are respectively arranged with a tangible width in a direction orthogonal to the longitudinal direction (that is, up-down direction in illustration of FIG. 2).

Therefore, light weight formation such as thinning plate thicknesses of the respective members or the like can be achieved by an extent of promoting the strength of the retainer 5 or the loop portions 6 by the integrated structure. For example, in expanding the air bag 2, the door 3 is pulled in a direction of expanding the air bag 2 (upper direction in illustration of FIG. 1), stress is concentrated at the loop portion 6 of the retainer 5, however, the strength of the loop portion 6 is promoted as described above and accordingly, light weight formation of the module can be achieved by thinning the plate thickness of the loop portion 6 or the retainer bar 7. Further, any two parts are not subjected to spot welding and therefore, the unit price of part can also be restrained low.

Figure 7:
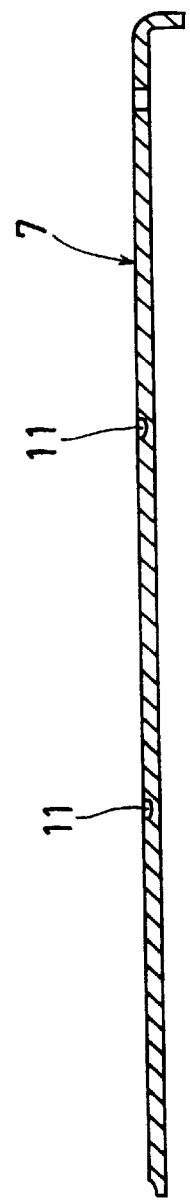
FIG. 7 is a sectional view of the retainer bar.

Further, according to the embodiment illustrated by the drawings, a projection 10 is formed on the inner side of the loop portion 6 of the retainer 5 where it is brought into contact with the retainer bar 7 and in the meantime, a recess 11 for fitting to the projection 10 is formed at a position of the retainer bar 7 shown by FIG. 7 in correspondence with the projection 10. In respect of the fitting structure where the fitting is carried out by the recess and the projection, the positions of the recess and the projection may be reversed and the recess portion may be provided on the side of the loop portion 6 and the projection may be provided on the side of the retainer bar 7. Further, a fitting structure by recesses and projections similar to the above-described can be formed and implemented at respective portions where the support pieces 8 are brought into contact with the retainer bars 7. The retainer bar 7 can be prevented from coming off the loop portions 6 of the retainers 5 by the recess and projection fitting simply and conveniently.

Figure 8:
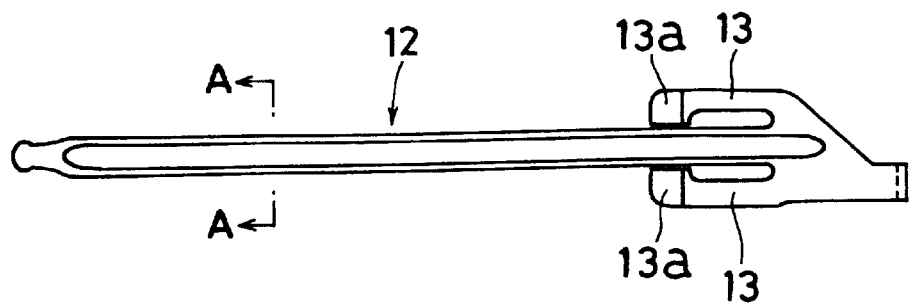
FIG. 8 is a front view showing other example of a retainer bar.
Figure 9:
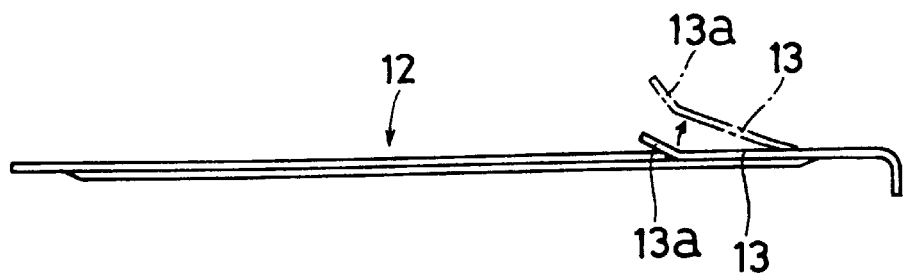
FIG. 9 is a side view of the retainer bar.
Figure 10:
FIG. 10 is a sectional view taken along a line A—A of FIG. 8.
Figure 11:
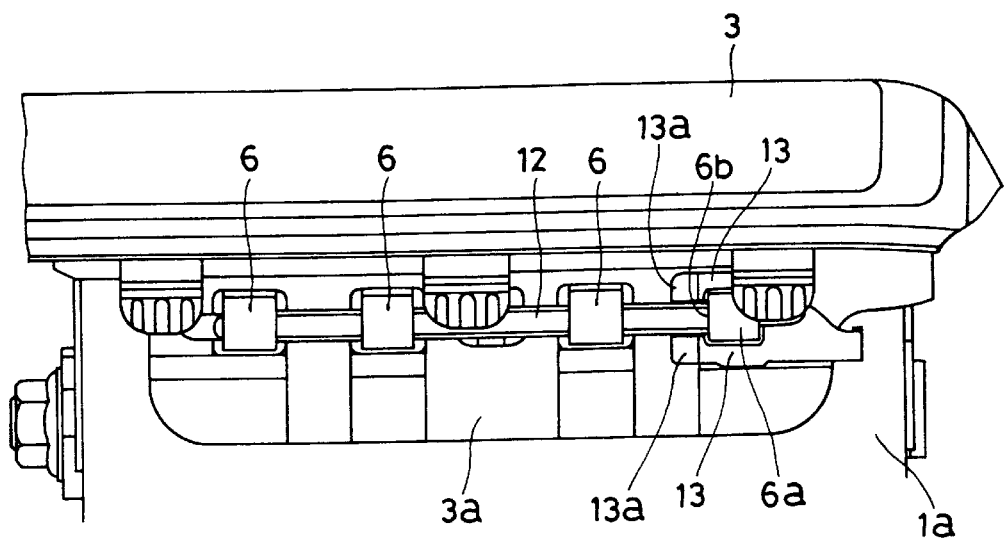
FIG. 11 is a front view showing a state where the retainer bar is attached.
Figure 12:
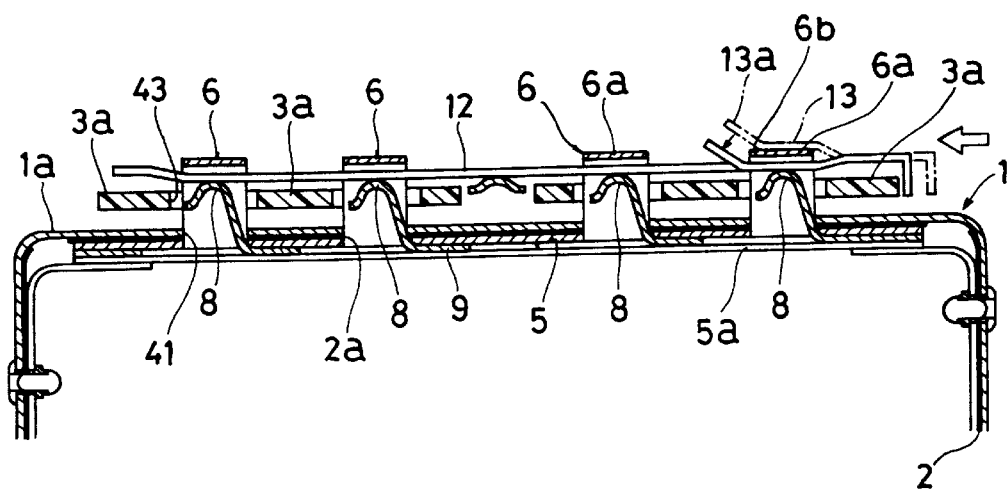
FIG. 12 is a sectional view of FIG. 11.

Further, FIG. 8 is a front view showing other example of a retainer bar, FIG. 9 is a side view of the retainer bar and FIG. 10 is a sectional view taken along a line A—A of FIG. 8. Also as shown by FIG. 11 and FIG. 12, a rear-at-insertion end portion of a retainer bar 12 is formed integrally with a pair of engaging spring leaves 13 capable of passing through portions of the loop portions 6 of the retainer 5 by elastic deformation and performing come-off preventing effect by being elastically engaged with a front-at-insertion end portion 6b of a tip portion 6a of the loop portion 6.

According to the engaging spring leaves 13, front end portions 13a are extended in a wing-like shape at both sides in the width direction from a main body portion of the retainer bar 12. The front end portions 13a are extended toward the front-at-insertion end portion with an interval substantially in correspondence with the loop portion 6 therebetween. Opposed side edges of front end portions 13a are formed in a hook-like shape. The front end portions 13a are formed respectively in a shape warped outwardly (toward outer side of the air bag case). As shown by FIG. 12, by inserting the retainer bar 12 into the loop portion 6, the retainer bar 12 rides over automatically the tip portion 6a of the loop portion 6 from the front end portion 13a while being elastically deformed and as shown by FIG. 12 or FIG. 11, the front end portions 13a recover to original positions and the front end portions 13a in a hook-like shape are engaged with the front-at-insertion end portion 6b of the loop portion 6.

Further, as shown by FIG. 10, the retainer bar 12 is formed to bend such that a section thereof orthogonal to the longitudinal direction is formed in a shape recessed inwardly (toward inner side of the air bag case) by which light weight formation and rigidity are maintained.

According to the air bag device of the above-described embodiment, the support pieces 8 for supporting the retainer bar 7 are disposed in the loop portions 6 of the retainer 5, the support pieces 8 are prevented from being deformed in handling and further, projection from the air bar case 1 can be reduced less than conventional device and accordingly, the mountability of the device to an instrument panel is promoted.

The insertion strength of the retainer bar 7 can easily be adjusted by a relationship between a plate thickness "t" thereof and a clearance "d" between the support piece 8 and the loop portion 6 as illustrated by FIG. 2. Further, the insertion strength of the retainer bar 7 can be adjusted also by a number of the support pieces 8 where the support pieces 8 are formed only at arbitrary ones of the plurality of loop portions 6 or the like. Accordingly, the operation of inserting the retainer bar 7 can be facilitated and assembling performance of the air bag device can be promoted.

What is claimed is:

1. An air bag device for a vehicle comprising:

an inflator which is a gas generator;

an air bag to be expanded by gas from the inflator;

an air bag case for storing the inflator and the air bag;

an air bag door for closing an opening portion of the air bag case;

wherein an attachment base portion at a lip portion of the air bag and a door attaching flange extended from the air bag door along a side wall of the air bag case are overlapped at the side wall of the air bag case at a vicinity of the opening portion, pluralities of through holes coinciding with each other are formed respectively at the side wall of the air bag case, the attachment base portion of the air bag and the door attaching flange, a retainer addingly brought into contact with an inner side of the side wall of the air bag case is provided, a plurality of engaging loop portions penetrating the through holes are projected from the retainer and in the penetrated state, a retainer bar in a shape of a locking bar is inserted through the loop portions by which the attachment base portion of the air bag and the flange for attaching the air bag door are attached to the side wall of the air bag case; and wherein the retainer is installed with support pieces for the retainer bar projected from base portions for the loop portions at inside of the loop portions, elastically pressing the retainer bar to front end sides of the loop portions and pinching and supporting the retainer bar between the support pieces and the front end portions of the loop portions.

2. The air bag device for a vehicle according to claim 1, wherein the support piece is formed by a tongue-like piece having a width in a direction substantially orthogonal to the opening face of the air bag case.

3. The air bag device for a vehicle according to claim 1 or 2, wherein a rear-at-insertion end portion of the retainer bar is installed with an engaging spring leaf capable of passing through the loop portion by being elastically deformed and constituting a come-off preventing piece by being engaged with a front end side of insertion of the loop portion.

4. The air bag device for a vehicle according to claim 1 or 2, wherein either one of a recess portion and a projection portion is formed at a portion of at least one of an inner side of a tip portion of the loop portion and the support piece which is brought into contact with the retainer bar, and either one of a projection portion and a recess portion fitted to the either one of the recess portion and the projection portion is formed in the retainer bar.

* * * * *